July 15, 1941.    J. R. GILLBERGH    2,248,982
METHOD AND APPARATUS FOR DETERMINING THE CHARACTER AND
POINTS OF INGRESS OF WELL FLUIDS
Filed Jan. 4, 1939    4 Sheets-Sheet 1
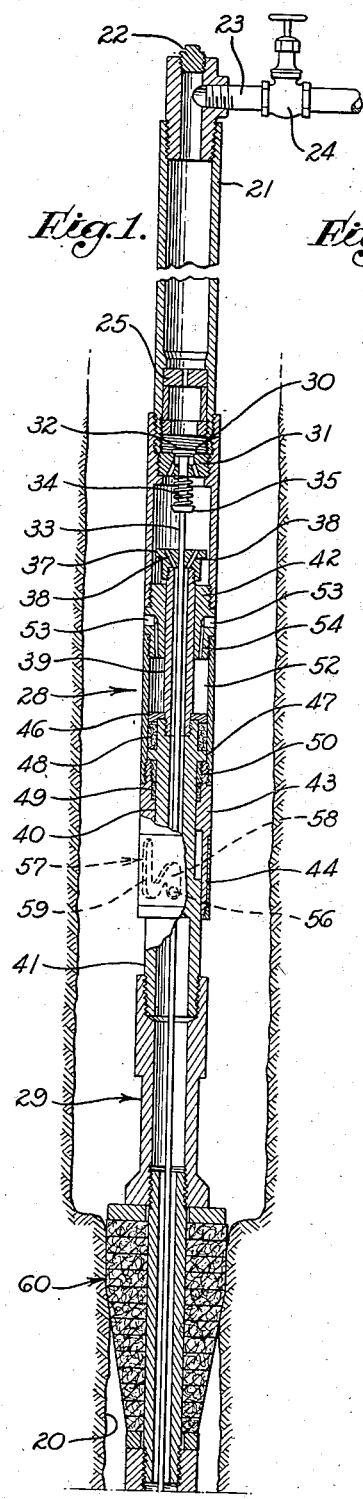
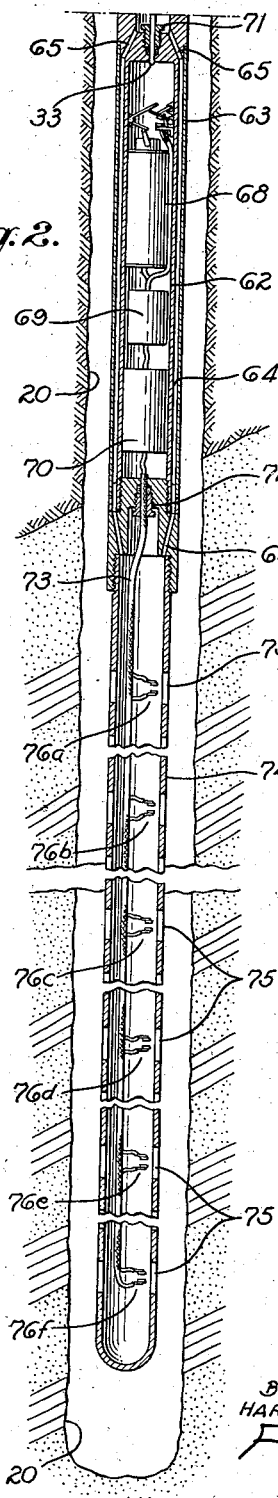
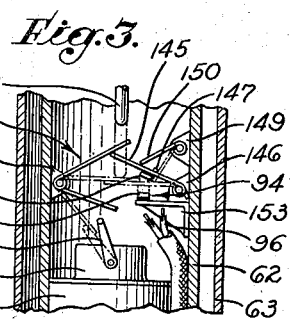
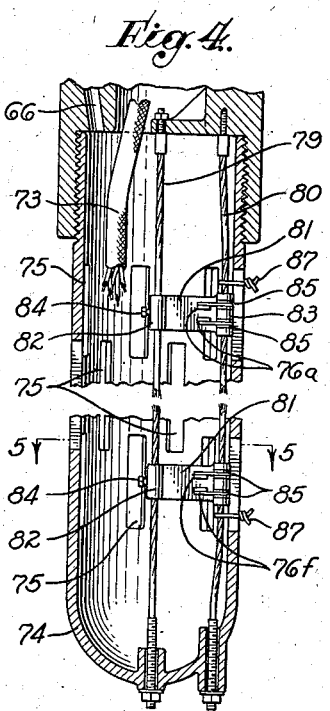
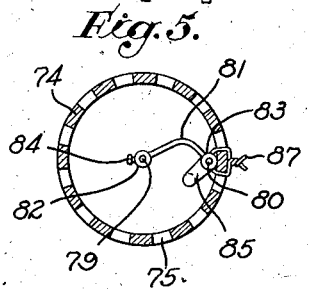
INVENTOR,
JOHN R. GILLBERGH
BY HARRIS, KIECH, FOSTER & HARRIS
FOR THE FIRM
ATTORNEYS

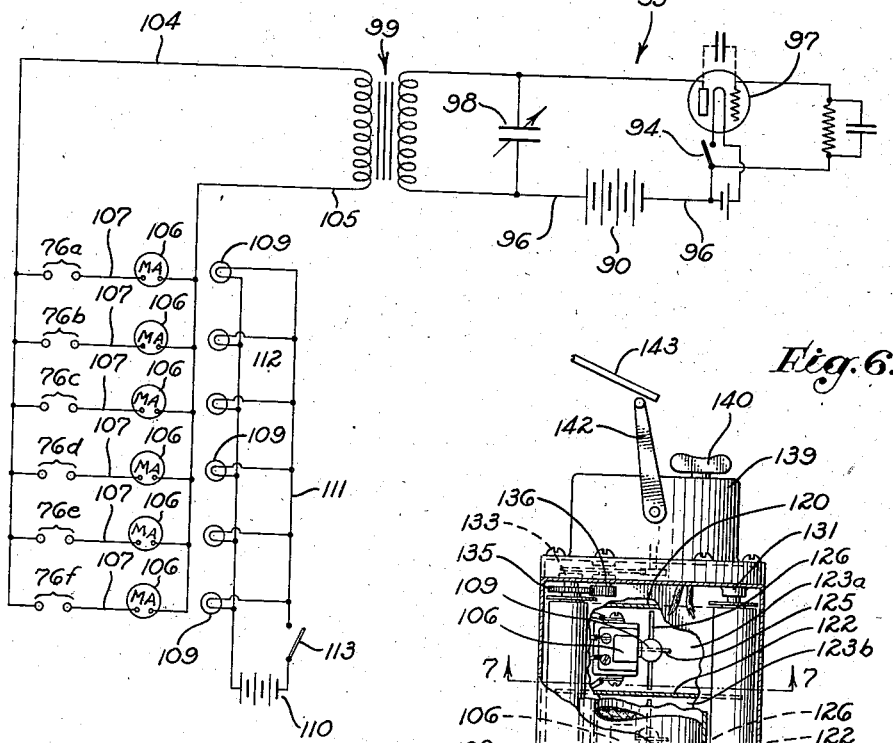
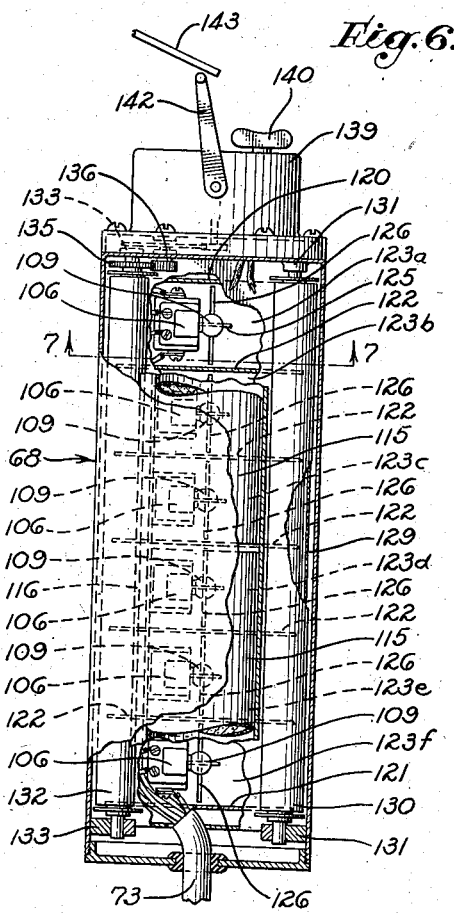
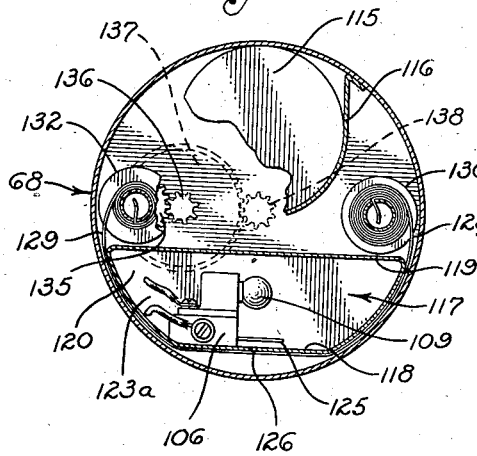

July 15, 1941.                J. R. GILLBERGH                2,248,982
        METHOD AND APPARATUS FOR DETERMINING THE CHARACTER AND
                   POINTS OF INGRESS OF WELL FLUIDS
                       Filed Jan. 4, 1939              4 Sheets-Sheet 3
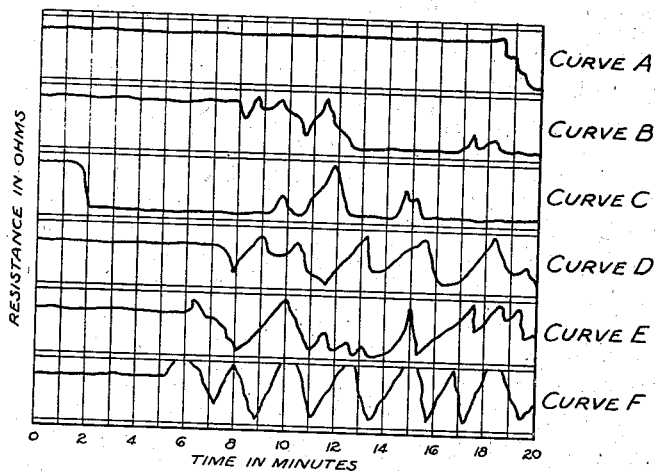
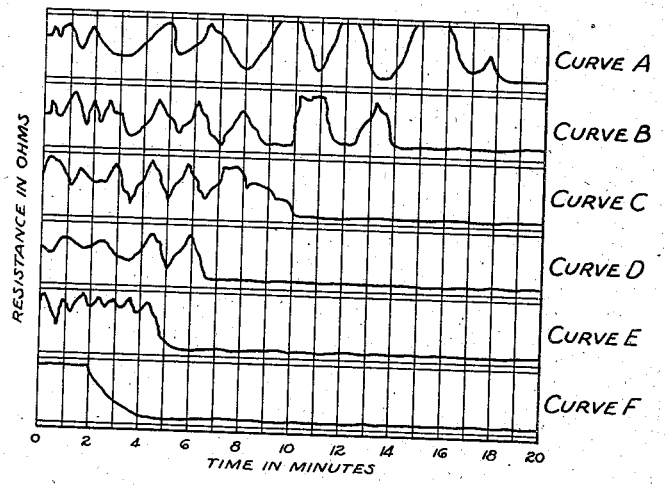
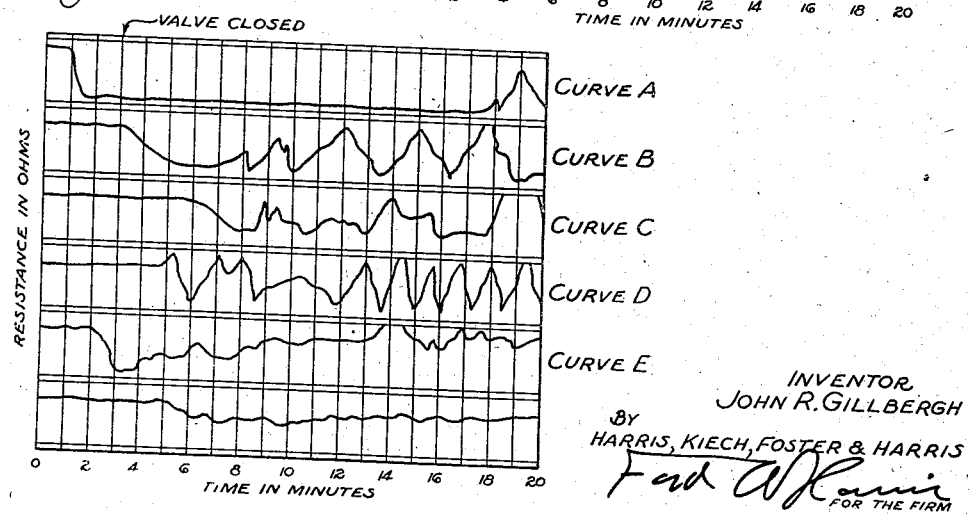
INVENTOR
JOHN R. GILLBERGH
BY
HARRIS, KIECH, FOSTER & HARRIS
ATTORNEYS July 15, 1941.
J. R. GILLBERGH
2,248,982
METHOD AND APPARATUS FOR DETERMINING THE CHARACTER AND POINTS OF INGRESS OF WELL FLUIDS
Filed Jan. 4, 1939
4 Sheets-Sheet 4
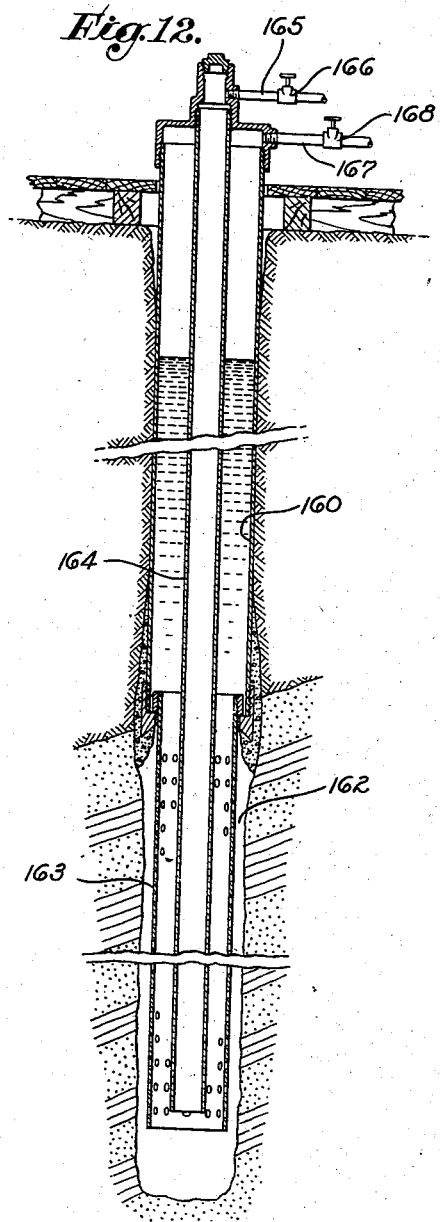
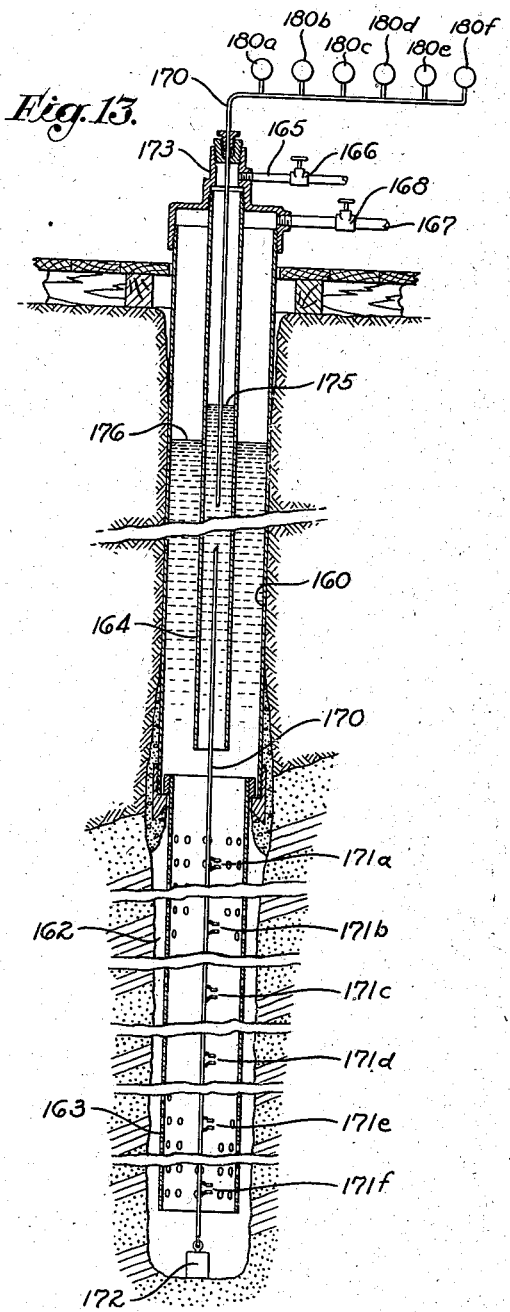
INVENTOR,
JOHN R. GILLBERGH
BY
HARRIS, KIECH, FOSTER & HARRIS
FOR THE FIRM
ATTORNEYS Patented July 15, 1941

2,248,982

UNITED STATES PATENT OFFICE 2,248,982

METHOD AND APPARATUS FOR DETERMINING THE CHARACTER AND POINTS OF INGRESS OF WELL FLUIDS

John R. Gillbergh, Pasadena, Calif.

Application January 4, 1939, Serial No. 249,266

27 Claims. (Cl. 175—183)

My invention relates to the art of exploring deep well bores and is particularly directed to the problem of locating the various levels of fluid ingress. While the principles involved may be practiced in various methods and apparatus for various purposes, the invention will, it is believed, be most widely applied to the location of water intrusion in oil wells. Since outstanding advantages appear in this latter application of the invention, I elect to direct my disclosure specifically to the problem of exploring an oil well to ascertain sources of water encroachment, no limitation being implied by my election.

Water intrusion in an oil well tends to increase progressively as production is continued and may threaten not only to flood the well, but also to spread over and ruin a whole oil field by migrating from one stratum to another. Such intrusion is almost always restricted to strata of ingress so limited in vertical extent that only relatively simple local remedies are necessary to protect the well. Accurately ascertaining the levels of water ingress, however, more often than not is extremely difficult. Both a high degree of skill and extensive experience are required, because only indirect methods are available, because so many diverse factors must be taken into consideration, and because wells vary so widely in such respects as pressure, fluid proportionment and distribution of strata. Only relatively few wells, say 2%, are ideal in the sense that factors may be readily isolated in an unmistakable manner for identifying the encroachment levels. In the overwhelming majority of wells overlapping complications and misleading factors are inevitable, whatever prior art procedure is selected. Usually such exploration is a matter of trial and error in which some basic procedure is repeatedly performed in an attempt to develop some clue, however indistinct and overladen, that will point to the water source.

An understanding of my invention may be approached advantageously by referring, first, to the more prevalent procedures heretofore employed. Each of the known practices is characterized by the traversing of the problematical bore hole, or a suspected portion thereof, by a single means that is responsive to changes in fluid character, a corresponding indicating instrument being observed at the surface. Various types of electrical indicating devices are employed, responding, for example, to changes in the ohmic resistance, light transmitting properties or electrolytic properties of the well fluids.

If the indicating device employed includes a pair of spaced electrodes on a well cable and responds to changes in the ohmic resistance of the well fluid, the well bore is first flushed with conditioning fluid that has an ohmic resistance differing widely from the ohmic resistance of the encroaching water. Generally the intruding water is saline, in which case the conditioning fluid is usually fresh water, but may be ordinary mud or chemically treated mud. The well fluids are completely replaced by a column of conditioning fluid exerting sufficient static pressure to hold in abeyance flow from the well formations. Commonly, a tube is lowered into the well for fluid circulation to carry out the conditioning operation, after which the tube is partially withdrawn and the test procedure initiated by swabbing conditioning fluid from the well to approach step-by-step the point at which static pressure of the conditioning fluid column balances formation pressure in the bore hole. The point of pressure equalization must be approached cautiously and it is necessary to explore the bore hole with the pair of electrodes after each swabbing operation to ascertain whether or not the resultant reduction in static pressure initiates well flow. Eventually the pressure predominance is reversed and the subsequent traverse of the bore hole by the pair of electrodes indicates the admission of formation fluids into the bore hole.

Successive traverses of all suspected zones by the indicating device are carried out, preferably, until substantially complete displacement of the conditioning fluid by formation fluids is indicated, swabbing alternating with testing when necessary. The resistance readings of the successive traverses are tabulated and then translated into corresponding successive curves plotted against well depth for careful study.

The disadvantages of such a typical procedure may be classified as follows: the excessive amount of time required for the test; the high cost of the test; the difficulty of obtaining adequate information from the test; the high degree of skill required to conduct the test; the danger of losing control of the well; and, finally, the fact that the test may not be employed for an uncased well. These disadvantages will be considered in order.

Such a test rarely is completed in less than two full days and often requires weeks. One reason that the test consumes so much time is that, since the amount of swabbing required to approach pressure equilibrium is unknown, and since a well is usually extremely sensitive as the critical point is approached, time-consuming caution is absolutely essential. The end sought is an optimum surge of formation fluid from the walls of the bore hole into the column of conditioning fluid to effect values of subsequent resistant measurements of the well content. Either too slight ingress of the formation fluids or too violent ingress will hopelessly obscure the results and necessitate conditioning the well for a new start. The unavoidable preliminary period of swabbing and testing for results, preceding any significant findings, is prolonged not only by the number of precautionary test readings necessary, but also by the fact that swabbing and testing may not be conducted simultaneously. The electrode cable must be completely withdrawn during swabbing, and, conversely, a test reading may not be made while the swab is in the well. If the well must be capped during the test, further delay is involved in the manipulation of the test cable through a packing gland at the surface. Even during the fruitful period of the test the procedure cannot be carried out rapidly because any suspected zone of the bore hole must be explored step-by-step in a time-consuming manner for the notation of resistant values. Such tests are usually continued until readings show the conditioning fluid to be completely displaced by intruding formation fluids and therefore are often unduly prolonged because migration of conditioning fluid to the test zone is favored by the fact that the whole fluid column in the well bore is in free communication with the test zone. Finally, repetitions of the whole painstaking test procedure are necessary more often than not, even under favorable conditions, because of reluctance to accept the results of a single test as conclusive.

The expensiveness of the prevalent type of procedure under discussion is attributable, of course, in large part to the fact that time is taken out of well production and to the further fact that holding well flow in abeyance for any substantial period may permanently reduce its output. But, in addition, the test is expensive because considerable labor must be expended before and during the test, and because supervision by a high salaried expert is necessary. Material costs, furthermore, are generally heavy for proper conditioning of a well, and no little expense is involved in the maintenance and replacement of test cables and surface equipment.

The inadequacy of the data produced by such a test is largely inherent in the test itself as will now be discussed.

In the first place, the procedure is fraught with misleading extraneous factors. Formation fluids, including salt water, that are driven from the bore hole into receptive strata under maximum pressure from the column of conditioning fluid tend to return to the bore hole with drop in bore pressure to contaminate the conditioning fluid and thereby introduce false clues into the resistance readings. Such points of reentry may be remote from the original points of ingress of the fluids. In addition, convection, diffusion, turbulence from movements of the test device, and conveyance of fluid from one level to another by the test device cannot be evaluated directly or separately identified, since all these effects may influence resistance values as effectively as the formation fluids to which the test is directed. The effect of the particular swabbing operation that first releases formation fluids, moreover, cannot be foretold, and since the recording instrument is necessarily inoperative at the moment of fluid release, no immediate clues for measuring the effect of the fluid release are presented. A violent initial surge of formation fluids into the well bore may so agitate the whole test zone as to preclude the formation of any representative resistance pattern, or such a pattern if formed may be shifted bodily along the bore hole by sustained flow before the test device can be lowered into the well. The human equation is a further consideration to be noted, since errors may arise in reading resistance values, in gauging the depth of the indicating device, or in translating the readings into graph form.

In the second place, even in the absence of false clues and inaccuracies, the data of the test may be inadequate because incomplete. I have made the important discovery that phenomena of only fleeting duration incidental to the initial flow of formation fluid into the well bore may often suffice alone to indicate conclusively the points of salt water ingress, yet at such time in the usual test procedure no such indications are discernible because the test device is out of the well. The test data as heretofore acquired are based on only intermittent observation with substantial time gaps in which highly significant transient factors may occur entirely unnoticed. Even when a test operation is in progress, only one point is under test at any given moment, with the result that fugitive as well as sustained effects at other points are completely ignored. This defect is more pronounced if time is taken to explore the fluid column carefully in a test traverse, since such care increases the intervals between readings at any one well level.

In the third place, certain difficulties arise in interpreting the graphically presented data of the test, especially since there is a conflict between the necessity, on the one hand, of seeking positive clues in the indirect evidence, and the necessity, on the other hand, of exercising caution and of discounting irrelevant or extraneous forces. There is an undesirable tendency in reading such a graph to interpolate data in the gaps between the successive curves, a tendency to assume, for example, that there are gradual transitions from curve to curve, whereas indicative effects may in fact be lost in one of the time gaps. A further consideration is a mental tendency to regard each of the successive graph curves as representing the entire test zone at a given instant, whereas, in fact, no line on the chart reflects a momentary well condition. Each line is separated in time from adjacent lines of the chart and each point on a given line is in time sequence to every other point on the line, so that no two points on the whole chart are concurrent. It is necessary, then, to avoid as unwarranted any assumption that any simultaneity whatsoever is represented by the chart.

The danger of losing control of a well in the course of a test is serious if high pressures prevail in the formation fluids. Such a well must be initially overbalanced by a fluid column of considerable weight. If the lowering of that column in the course of a test is overdone, the conditioning fluid will be forced upward out of the well, preponderance of the well pressure rising rapidly. The unbalancing may progress too far for control if the top of the well is left open to expedite the test, especially if the reversal of pressure occurs while a swab is in operation.

A further respect in which the test procedure under discussion is far from ideal is that it is not applicable to uncased wells. In the first place, the fact that the column of drilling fluid in effect supports the walls of the uncased hole precludes any substantial lowering of the column pressure for test purposes; and in the second place, an operator dares not risk irreparable damage to the walls of the bore hole by repeated traverses of a testing device. To make a test for accurately locating the troublesome points of water entry it has been necessary heretofore to case the bore hole, with no assurance beforehand that the well will not have to be abandoned, or that another string of casing will have to be inserted in the well, because of too extensive water intrusion.

Finally, it is apparent from the disclosure to this point that the test procedure described is difficult, complicated, and full of pitfalls. Specialized talent and experience are necessary for intelligently modifying the basic procedure to meet a given situation, and only rarely will a test procedure successful for one well succeed if applied blindly to the next well.

The general object of my invention is to remedy in a test procedure each of the defects and disadvantages of prior art practices mentioned above.

I propose to reduce the test period to a matter of hours instead of days and weeks, and to avoid most of the heavier cost items heretofore involved.

With respect to the test data, it is my purpose to concentrate on primary factors, to minimize false clues, to secure continuous data under actual flow conditions, to reveal simultaneous as well as sequential relationships, to produce a simple and easily interpreted chart, and to eliminate substantially the human equation.

Another broad object in mind, is to provide a test procedure that involves no risk of letting a well blow out.

One of the more important general objects of my invention is to achieve a test procedure that is safely applicable to uncased bore holes, whereby the character and exact location of water encroachment may be determined without the necessity of investing in casing for the bore hole. This feature of my invention will decrease materially the cost of speculative drilling in untested fields.

A further broad object of my invention is to reduce the test to a relatively simple procedure that may be conducted for accurate and conclusive results with a modicum of skill on the part of the operator.

In the preferred form of my invention it is my object to provide for performing the test, largely by completely automatic means and to dispense with the necessity for operating through a packing gland at the surface and the necessity for manipulating reels, cables, and similar paraphernalia in the course of the test.

In a test of the character I have in mind, the significant clues are anomalies in the resistance curves. I have discovered that such anomalies are often precluded or escape notice entirely if the flow of formation fluid into the bore hole occurs too rapidly, as is often the case when a swab is used to lower the fluid level, whereas such anomalies will stand out in the record if the curves are attenuated by providing for restrained but continuous flow from the formation walls in the test zone. One of the more specific objects of my invention, therefore, is to provide adjustably controlled means for releasing the fluid pressure in a test zone at a gradual and uniform rate to attenuate the test curves and in effect to magnify anomalies on a time scale.

It has been pointed out heretofore that certain false clues arise from the fact that in the usual practice the test zone is in communication with the whole column of fluid in the well. Another of my more specific objects, then, is to provide a test procedure in which the suspected zone is entirely isolated from the main body of the fluid column whereby all test factors are localized.

Broadly, my invention is characterized by the conception of continuously and simultaneously recording changes in fluid character at a plurality of points in a test zone under conditions that simulate or approximate normal production flow. It is my further object, then, to provide means for such simultaneous recording of data at a plurality of levels and to provide for establishing a representative flow status. A feature of my invention is the provision for an unbroken recording period that includes the moment of flow initiation so that effects associated with the first surge of formation fluids may be studied.

Other objects and advantages of my invention will be apparent in the course of my more detailed description to follow, taken with my accompanying drawings.

In the drawings:

Figs. 1 and 2, taken together, show in vertical section the preferred form of my apparatus installed in a bore hole, the lower end of the apparatus being shown diagrammatically;

Fig. 3 is an enlarged fragment of Fig. 2;

Fig. 4 is an enlarged vertical section of the lower end of the apparatus showing the construction of parts illustrated diagrammatically in Fig. 2;

Fig. 5 is a transverse section taken as indicated by the line 5—5 of Fig. 4;

Fig. 6 is a side elevation of the case for recording instruments employed in the preferred form of my invention, the case being broken away to reveal its interior;

Fig. 7 is a transverse section taken as indicated by the line 7—7 of Fig. 6;

Fig. 8 is a wiring diagram of the recording system;

Figs. 9, 10, and 11 are representative graphs produced by the recording means;

Fig. 12 is a diagrammatic representation of a cased well being conditioned for a second practice of my invention; and Fig. 13 is a similar view of the well in the course of my second test procedure.

Figs. 1 and 2 show an uncased bore hole, the lower portion of which is of reduced diameter. In a typical situation it is known that both water and petroleum fluids are produced in this lower restricted portion of the bore hole 20 and the problem is to ascertain the points of water ingress. The apparatus for exploring this lower portion of the bore hole 20 is incorporated in a string 21 of drill pipe or tubing, the string being divided into an upper section and a lower section that are telescoped together for relative longitudinal movement. The top of the string 21 is closed as by a plug 22 and is provided with a discharge pipe 23 controlled by a valve 24. At some point in the string 21 is a flow bean 25 to restrain upward flow therethrough.

The upper section of the string 21 is generally designated 28 and the lower section is generally designated 29. Toward the lower end of the upper section 28 is a valve, generally designated 30, comprising a seat member 31 and a valve member 32 having a long rod-like stem 33 extending axially down into the lower section 29 of the string. This valve is continuously urged toward closed position by a suitable spring 34 acting between the seat member 31 and a collar 35 on the stem 33.

The upper end of the lower section 29 of the tubing string terminates in a bushing 37 embracing the valve stem 33 and having a plurality of bores 38 for the passage of fluid. The bushing 37 is mounted on the upper end of a tubular guide portion 39 of reduced diameter that in turn is mounted on a guide portion 40 of intermediate diameter, and just below the guide portion 40 is a third guide portion 41 of relatively large diameter. The upper section 28 of the tubing string has elements complementary to and slidingly cooperative with these three guide portions, namely, a guide bushing 42 embracing the guide portion 39, a tubular portion 43 embracing the guide portion 40, and, finally, a terminal portion 44 embracing the guide portion 41.

The described sliding joint between the two sections of the tubing string is sealed by suitable packing. For this purpose a ring 46 on the lower tubing section 29 is mounted on the lower tubing section at the upper end of the guide portion 40, and the guide portion 40 is provided with an annular flange 47 spaced below the ring 46, the ring, flange, and guide portion 40 thus forming a space to receive a packing ring 48. A second packing ring 49 embracing the guide portion 40 is retained by a bushing 50 engaging the tubular portion 43 of the upper tubing string.

The annular space 52 around the guide portion 39 between the guide bushing 42 and the plate 46 will change in volume with relative movement between the two tubing sections. Since this space is above the two packing rings, it is desirable to provide a suitable means for releasing fluid therefrom when the space contracts. For this purpose the bushing 42 may be provided with shallow radial bores 53 communicating with longitudinal bores 54 to the space 52.

The valve 30 is opened against the pressure of the spring 34 by relative movement between the tubing sections 28 and 29, lowering of the tubing section 28 carrying the collar 35 against the bushing 37 to unseat the valve member 32. It is desirable that relative movement between the two tubing sections be limited in a positive manner to prevent opening of the valve 30 until the test apparatus is installed in the bore hole, but subsequent to such installation sufficient downward movement of the upper tubular section against the stationary lower tubing section must be permitted for operation of the valve 30. In my preferred arrangement the lower tubing section is provided with a radial lug 56 at the guide portion 41 to cooperate with a slot, generally designated 57, in the terminal portion 44 of the upper tubing section 28. This slot has a portion 58 of too limited vertical extent to permit opening of the valve 30 and has a second portion 59 that will permit relative movement sufficient to operate the valve, the lug being carried from one slot portion to the other by approximately a quarter turn of relative rotation between the two tubing sections.

The lower tubing section 29 carries a rathole packer 60 of any suitable type that is adapted to engage the upper end of the restricted bore 20, thereby to form with the tubing string an effective seal between the reduced bore 20 and the major portion of the well above the zone to be tested. Somewhere in the lower tubing section 29 either above or below the packer 60 is an instrument cylinder 62 incorporated in a length of tubing 63. The annular space 64 between the instrument cylinder 62 and the wall of the tubing 63 provides a longitudinal passage for fluid through the tubing past the cylinder, the passage communicating with bores 65 and 66 at its upper and lower ends respectively. The contents of the instrument cylinder 62 are dependent upon the type of means responsive to changes in fluid character that is elected for the test. Any suitable responsive means may be employed, including photoelectric means to record the light transmitting character of the fluids under test, but I prefer to carry out my test by means responsive to changes in the ohmic resistance of the fluids being explored. The instrument cylinder 62 in the preferred form of my invention houses a recording case 68, a battery case 69, and a case 70 for means to convert direct current into alternating current.

Since I prefer as a feature of my invention to operatively relate the valve 30 with the recording means, I extend the valve stem 33 into the upper end of the instrument cylinder 62, the valve stem extending through a suitable packing gland 71. At the lower end of the instrument cylinder 62 is a second packing gland 72 embracing a conductor cable 73 that extends downwardly into a terminal tube 74 having numerous perforations 75. The cable 73 includes conductors for a plurality of pairs of electrodes, there being in the form of my invention shown in the drawings six pairs of electrodes, generally designated 76a to 76f.

The pairs of electrodes 76 are shown diagrammatically in Fig. 2 and may be mounted in the perforated tube 74 in any suitable manner. A feature of the preferred form of my invention, however, is the conception of mounting the pairs of electrodes for adjustable spacing in the perforated tube 74. A suggested construction may be understood by reference to Fig. 4. In this suggested construction two parallel support cables 79 and 80 are suitably anchored in longitudinal disposition in the tubing 74. A plurality of electrode carriers 81 having tubular portions 82 and 83 slidingly embracing the support cables 79 and 80 respectively are adjustably retained at selected positions by set-screws 84 releasably engaging one of the cables. Each of the carriers 81 has a pair of arms 85 supporting in spaced relation a pair of the electrodes 76. To insure maintaining the electrodes in fixed positions uniformly spaced from the walls of the perforated tube, the cable 80 may be bound to the wall of the tube by spaced wire ties 87.

Electrical circuits that may be employed in my apparatus are shown diagrammatically in Fig. 8. A battery 90 housed in the battery casing 69 energizes means in the case 70 for producing an alternating current. For example, the battery 90 may be hooked up through wires 96 with an oscillating circuit that is generally designated by the numeral 95 in Fig. 8. The particular oscillating circuit shown, which is a well known arrangement that includes a vacuum tube 97 (Type '30) and a variable condenser 98, is connected with the primary terminals of a transformer 99 and is controlled by a switch 94. One of the secondary terminals of the transformer 99 is connected through a wire 104 with one electrode of each of the pairs of electrodes 76 and the other secondary terminal of the transformer is connected through a wire 105 to a series of milliammeters 106, each of the milliammeters being connected in turn through a wire 107 with the second electrode of the pairs of electrodes 76.

The values indicated by the milliammeters 106 may be recorded in any suitable manner, but in the preferred form of my invention I obtain a photographic record of these values and for that purpose employ a lamp 109 with each of the milliammeters, the plurality of lamps being energized by an independent circuit including a battery means 110, leads 111 and 112, and a light switch 113.

The recording instrumentalities can be arranged in the recording case 68 as indicated in Figs. 6 and 7. Two dry cell batteries 115 constituting the previously mentioned battery means 110 for energizing the lamps 109 are secured in the recording case 68 by an arcuate longitudinally extending wall 116. On the opposite side of the recording case is a longitudinal light chamber, generally designated 117, having a somewhat arcuate longitudinal wall 118, a plane longitudinal wall 119, end walls 120 and 121, and a series of transverse partitions 122 dividing the light chamber into a series of recording compartments 123a—123f. In each of the recording compartments one of the lamps 109 is so positioned with respect to a needle or indicating arm 125 of the associated milliammeter 106 that the shadow of the needle intersects a suitable recording slot 126 in the wall 118. Photographic film 129 from a supply spool 130 journaled in bearings 131 is fed around the wall 118 of the light chamber 117 past the series of recording slots 126 to a driven spool 132 journaled in bearings 133. Integral with the spool 132 is a gear 135 that is driven through a train of gears 136, 137, and 138 by clockworks, generally designated 139, having a winding key 140.

While the test apparatus is being installed in a bore hole, it is necessary that the clockworks be idle and it is desirable that the two switches 97 and 113 be open. During a test period, however, that is initiated by closing of the valve 30 in the tubing string, it is necessary that the clockworks actuate the film and that the two switches be closed. A suggested mechanical arrangement for operatively relating the recording instruments with the valve 30 may be understood by referring to Fig. 3.

The clockworks 139 is controlled by an upwardly extending control arm 142, which in the position shown in full lines in Fig. 3 latches the clockworks against movement, and in the dotted line position of Fig. 3 permits the clockworks to actuate the spool 132 and thereby to draw the film past the recording slots 126. The control arm 142 may likewise operate both the switches 97 and 113 if desired. In the form of my invention shown in the drawings, however, it is contemplated that only the switch 113 for the lamp will be operated directly by the control arm 142, the operative connections not being shown. Above the control arm 142 is a bell-crank 143 pivoted on a bracket 144, the upper arm of the bell-crank being in the path of the valve stem 33 and the lower arm of the bell-crank being adapted to actuate the control arm 142. Normally, the control arm 142 being in its upper latching position, the bell-crank 143 is held in an elevated position by a suitable leaf spring 145 mounted on a bracket 146, the leaf spring carrying a latching lug 147 on its upper surface. Pivoted above the leaf spring 145 on a suitable bracket 149 is a freely rotatable latching finger 150 that rests upon the leaf spring 145 but drops behind the lug 147 to hold the latch spring depressed whenever the latch spring is flexed downwardly sufficiently by the end of the valve stem 33. The latched position of the leaf spring and the corresponding position of the latching finger are indicated by dotted lines in Fig. 3.

The leaf spring 145 may conveniently serve as the movable member of the switch 97. For this purpose a switch contact 151 is mounted on the lower side of the leaf spring 145 and a cooperating fixed contact 152 is mounted therebelow on a suitable fixed arm 153, the two contacts being connected to the associated circuit wires 96. It is apparent that sufficient downward movement of the valve stem 33 will not only release the clockworks 139 for operation, but will also close both the switches 97 and 113, the clockworks and the switches being thereafter operative for a test period independently of subsequent movements on the part of the valve stem 33.

Preliminary to the operation of my device, it is not always necessary to introduce special conditioning fluid into the bore hole, especially if there is a sufficient ohmic reistance differential between the valuable fluids and the encroaching water. In the usual procedure, however, conditioning fluid, which may be in the form of plain water, will be introduced into the well to a height to overbalance formation pressures and thereby to hold in abeyance formation flow. To secure the requisite hydrostatic pressure, relatively heavy mud may be employed if necessary.

The tubing string 21 is assembled at the surface with the lug 56 of the lower tubing section 29 engaging the restricted vertical portion 58 of the slot 57 in the upper tubing portion 28 of the string. An unexposed roll of film is on the spool 130 ready for movement past the recording slots 126, but the control arm 142 is in its upper position to hold the film actuating mechanism in abeyance and both the switch 97 controlling current to the electrodes and the switch 113 controlling the lamps 109 are in open position. The lower section 29 of the tubing string is suspended from the upper tubing section 28 by engagement of the lug 56 with the slot 57, but the limited vertical dimension of the portion 58 of the slot prevents sufficient relative axial movement between the two sections of tubing to cause the valve 30 to open or to cause the valve stem 33 to initiate operation of the recording system.

The whole string of tubing 21 initially is empty except for atmospheric air. As the string is lowered into the column of fluid in the well bore some liquid will be forced into the perforated tube 74 and perhaps upwardly in the tubing string above the packer 60, but the valve 30 will remain closed to prevent any substantial upward flow. When the packer 60 seats into the top of the reduced portion 20 of the bore hole, static pressure of the fluid column above the packer will act upon the upper end of the packer, the packer then becoming an effective annular seal to isolate the test zone below the packer from the major portion of the fluid column in the bore hole.

When the test apparatus is ready for operation in the well, the disposition being as indicated by Figs. 1 and 2, the upper tubing string 28 is manipulated to rotate the slot 57 into a position at which the lug 56 is in the relatively long vertical portion 59 of the slot. The upper section 28 of the tubing string is then moved downwardly to open the valve 30 and simultaneously to initiate operation of the recording mechanism, the collar 35 of the valve stem 33 striking the bushing 37 to open the valve and the lower end of the valve stem striking the bell-crank 143 to release the clock mechanism and to close both of the two switches.

Since the fluid in the test zone is under exceedingly high pressure, fluid immediately flows upwardly through the tubing string at a rate controlled by the aperture of the flow bean 25. Both fresh formation fluids and extraneous fluids previously driven into receptive strata of the test zone begin to flow into the test zone as soon as the pressure below the packer 60 drops below formation pressure, initial formation flow usually following opening of the valve 30 by only a few seconds. It is important to note, however, that operation of the recording system is initiated immediately so that the moment of initial formation flow lies within the recording period.

One of the important advantages of my test method is that actual flow conditions are simulated in a relatively short period. If the whole bore hole were in communication with the test zone to permit extensive counterflow, a considerable volume of flow would be necessary to clear the test zone of conditioning fluid and establish stable flow conditions or a relatively stable flow pattern in the test zone for reflection in the test record. By isolating the test zone in the manner described, however, I am enabled to displace the conditioning fluid completely from the test zone and to attain representative flow conditions therein within a relatively short period. Because only a relatively small volume of well fluid need be displaced for a conclusive test, because I dispense entirely with any preliminary groping for a critical hydrostatic pressure, and because the test continues unbrokenly without interruption of flow for manipulation of test devices and without interruption of recording for manipulation of flow control devices, I am enabled to accomplish my object in a relatively short recording period. For example, I may elect to have the film and the associated recording instrumentalities in operation for a period of only twenty minutes.

In the test period, whatever the length of time decided upon, I propose to reflect in my records the characteristics of three successive stages of flow in the test zone, each of which stages as reflected in the records, considered alone or in the light of the other stages, points to the information sought by the test. The first of these stages is the initiation of well formation flow, this stage including the momentary effects of such flow initiation. The second stage of flow is the transition stage during which the fluid in the test zone at the beginning of the test is completely displaced from the test zone. The third stage is signalized by the attainment of a relatively stable flow pattern simulating actual production conditions. In this third stage the test zone is occupied entirely by formation fluids streaming through the test zone in a flow pattern determined by the distribution of points of ingress, relative pressures and volumes, and the characteristics of the different formation fluids.

A feature of my invention is that by controlling the rate of flow from the test zone, for example, by employing the flow bean 25, I may control the rapidity with which these stages succeed each other and the rapidity of the effects involved. Within a twenty-minute recording period I may readily cause all three stages to appear on the photographic record and yet retard the sequence of effects to attenuate the recorded curves for clarity of reading. Control over the degree of attenuation in the resistance curve is of especial importance in high pressure wells, because under the conditions of the usual water test the first two stages of flow in the test zone are of such fleeting duration that the significant characteristics of those stages are often entirely lost.

Type test curves representing twenty-minute test intervals are shown, by way of illustration, in Figs. 9 to 11, each of the figures corresponding to a single test film and each of the curves being the result of photographing the shadow of a milliammeter needle at one of the slots 126. On each film are six curves falling in fixed horizontal bands representing levels A to F corresponding to the location of pairs of electrodes 76a to 76f respectively.

In Fig. 9, for the first two minutes of the recording interval, curves A, B, C, D and E fluctuate in the manner that characterizes the inflow into the conditioning liquid of gas and oil from productive strata; while the curve F during the initial two minutes of recording is constant at a relatively high value that characterizes the conditioning fluid. At the end of the two minutes, however, curve F drops off in a definite manner indicating the inflow of salt water and by the end of the first four minutes of the test becomes stable at a low resistance value indicating complete displacement of the conditioning fluid from the corresponding well level. By the end of five minutes, it is apparent that salt water moving upwardly from the well level F has definitely depressed the resistance values of curve E. In sequence thereafter curve D is definitely depressed after six and one-half minutes of recording, curve C after ten minutes, curve B after fourteen minutes, and curve A after eighteen minutes of recording. The chart shown in Fig. 9, then, clearly indicates that water is entering the well bore in the vicinity of the well level at which the electrodes 76f are located.

In the record represented by Fig. 10, it is apparent that until near the end of the first two minutes of recording, the ohmic values of all the curves correspond to the relatively high resistance characteristic of conditioning fluid. At the two minute point, however, a sharp and extensive drop in the value of curve C indicates the sudden ingress of a substantial flow of salt water at the corresponding well level. The behavior of curves D, E, and F shows that gas and oil start to flow at the corresponding well levels after five to eight minutes of recording but do not suggest the ingress of salt water. The gas and oil flowing upward through the test zone to mingle with the salt water at the well level represented by curve C cause fluctuations in the curve C but the curve C persistently seeks a low ohmic value indicative of continued salt water ingress. After eight minutes of recording, curve B reveals some inflow of oil and gas at the corresponding well level, but the resistance values of curve B are soon thereafter depressed by upwardly flowing salt water from the level corresponding to curve C. Curve A indicates no formation flow of any kind, but toward the end of the test period drops sharply as salt water reaches the corresponding well level. It is apparent, then, that the record represented by Fig. 10 indicates salt water intrusion at the level corresponding to electrodes 76c, just as the records represented by Fig. 9 indicated salt water intrusion at the level corresponding to electrodes 76f.

In all of these tests, the tendency of salt water to diffuse through the liquid content of the test zone must be kept in mind, the rate of diffusion being greater in a downward direction than in an upward direction. If the rate of flow from the test zone is severely restricted by the flow bean employed, diffusion may affect and even dominate the resistance curves of the record. The effects of diffusion have been troublesome and confusing in all prior art test procedures because the extended time required by the prior procedures has favored development of diffusion effects. In one practice of my invention, as performed by the apparatus described, I, in effect, isolate diffusion effects and study such effects under static and substantially quiescent conditions not heretofore attained in a test procedure. In this latter practice of my invention, I open the valve 30 in the tubing string for only a very short time at the beginning of the recording period and then either keep the valve closed during the rest of the period or open the valve for selected time intervals, the valve movements being carefully tabulated for consideration with the corresponding photographic record. It will be apparent that since the recording system described above functions independently of the valve after it is started by the first valve movement, the apparatus is adapted to the procedures here suggested.

As an example of a record based primarily on diffusion effects, attention is directed to Fig. 11. Such a chart would result from shutting off flow from the test zone of a well of a certain character after three minutes of flow, no further flow from the test zone being permitted throughout the period under observation. The chart shows that salt water entering with a rush at the level corresponding to curve A provided a body of salt water at the corresponding well level and that inflow of salt water also occurred at the level corresponding to curve E. Curve A remained depressed throughout nearly the whole of the quiescent recording period, recording migrating oil and gas only at the end of the period. The values of curve E, however, did not remain depressed and the fact that curve E in the latter half of the test period persistently sought higher levels reveals that the salt water ingress at the corresponding well level was not permanent. In other words, the formation at the level corresponding to the electrodes 76e is a receptive stratum, probably an oil-stained sandy shale containing some gas. The preliminary relatively high hydrostatic pressure attained in conditioning the well for the test drove some salt water into this receptive formation and this extraneous salt water flowed back into the conditioning fluid for a short period when the pressure in the test zone was subsequently lowered. Apparently, curve B corresponds to a shale level in the well, since salt water diffusion downwardly from the upper well level of the test zone represented by curve A depressed the values of curve B. This downward diffusion later affected the average values of curve C. Fig. 11 would be interpreted, then, to indicate that levels corresponding to curves B and F are horizons of impervious shale; that some gas issues from a sandy shale at the level corresponding to curve E; that curve D corresponds to an active production level; that curve C has a formation producing oil at a somewhat reduced pressure; and that salt water is intruding to a serious degree in the neighborhood of the level represented by curve A. It is to be noted in contrast to prior art test procedures for measuring diffusion that I insure complete cessation of flow from the test zone during the time interval of the diffusion test and that I eliminate all mechanical causes for agitation or turbulence in the fluids of the test zone in that time interval.

It will be further noted that the recorded values common to a vertical line represent simultaneous conditions at the corresponding well levels. Important also is the fact that any point on one of the curves may be evaluated by comparison with the curve as a whole. In other words, it is apparent at once whether a given value shown on a curve is representative and significant or transient and not significant. Continuity of recording throughout the test period, then, permits me to differentiate readily primary effects from secondary effects.

In the older methods resistance values are taken at successive moments at successive levels. It is apparent from Figs. 9 to 11 that a great many of such random values obtained by traversing the well zone with a single indicating device would be necessary to reveal the trend of the values at the various well levels in the test zone and that significant effects would inevitably escape detection.

During the previously mentioned third stage of flow in the test zone when production flow is simulated, the character of the recorded curves will clearly reveal the location and extent of water ingress. In such case no conditioning fluid may be necessary. For the majority of tests, the initial presence of conditioning fluid is desirable but a feature of my invention is that since the test zone is isolated from the major portion of the fluid column in the well, it may not be necessary to have the conditioning fluid constitute the whole liquid content of the well. This fact is an important advantage in conducting repeated tests. After one test has been made, it is possible to repeat the test after a relatively short pause for lowering a tube into the test zone for pumping only sufficient conditioning fluid for displacement of well fluids from the conditioning zone, the fluid state of the well above the test zone being largely ignored.

The fact that a test may be repeated conveniently with no considerable loss of time, and the fact that a construction such as shown in Fig. 4 enables me readily to redistribute the electrodes, enable me to proceed, first, to "bracket" the point or points of salt water ingress and then with a second more compact arrangement of the electrodes to explore indicated levels more intensely for more precise information. In other words, I may in a first test run have my pairs of electrodes spaced at relatively widely separated levels in the test zone to ascertain only approximately the level or levels of water ingress, and then in a following test run have the electrodes spaced at relatively short vertical intervals for concentrated exploration of a restricted portion of the bore hole suggested by the record of the first test run. Such a procedure will bound a salt water horizon within closer dimensions than heretofore possible and often will make it possible to block off a troublesome strata without precluding flow from an adjacent productive formation.

While I have described an apparatus and procedure for testing an uncased well, it will be apparent to those skilled in the art that the same procedure may be applied to a cased well, the only change in the apparatus necessary being the substitution of a wall packer for the rathole type of packer.

While the procedure heretofore described is preferred because of the several advantages derived from isolating the test zone and from reducing the volume of fluid involved in the test, it will be clear to those skilled in the art that my invention may be practiced without employing a packer to isolate the test zone. One such procedure, for example, may be understood by referring to Figs. 12 and 13, Fig. 12 showing a well in the preparatory stage of the test, and Fig. 13 showing the well in the course of the test procedure. The major portion of the bore hole is protected by casing 160, the zone to be tested lying in the lower uncased portion 162 of the bore hole into which extends the usual perforated liner 163.

Preparatory to testing such a well a string of tubing 164 is lowered into the test zone and the top of the well is sealed off. At the top of the well the tubing 164 communicates with a pipe 165 controlled by a valve 166 and the annular space between the casing 160 and the tubing 164 communicates with a second pipe 167 controlled by a valve 168. All the well fluids in the bore hole may be readily replaced in a well known manner by simply pumping conditioning fluid into the well through one of the pipes 165 or 167 and permitting fluid to flow from the well through the other of these pipes until the discharged fluid is substantially free of well fluids. The tubing 164 is then withdrawn to a level above the test zone as shown in Fig. 13, and a test cable 170 carrying a plurality of pairs of electrodes 171a to 171f is lowered into the well. Any suitable arrangement may be employed for making the cable taut. For example, a weight 172 of suitable mass may be attached to the cable. The well will be sealed by employing a packing gland 173 where the cable enters the tubing.

A condition is then sought that will simulate in the test zone normal production flow. To this end I may introduce a gas through either pipe 165 or pipe 167 to attain a status in which flow of formation fluids into the test zone is held in abeyance by the weight of the conditioning fluid in the well plus the pressure of gas on the fluid, the fluid column itself not being of sufficient weight alone to overbalance formation pressure. To achieve this state, it will usually be necessary, first, to introduce enough conditioning fluid to overbalance formation pressure while the test cable is being installed and then, after sealing the top of the well, to introduce gas through one of the two pipes 165 and 167 to a sufficient extent to force a considerable volume of the conditioning fluid out of the well through the other pipe.

After the desired combination of gas pressure and liquid weight is achieved, it is necessary for initiation of flow in the test zone merely to open whichever one of the valves 166 and 168 communicates with the compressed gas body above the liquid column. For example, if the requisite amount of gas is introduced through the pipe 167 to force the requisite amount of conditioning fluid out of the well through the pipe 165, subsequent closing of the valve 166 to shut off the pipe 165 and partial opening of the valve 168 to open the pipe 167 will cause the liquid in the well to take, say, the level 175 in the tubing 164 and the level 176 in the annular space around the tubing. Continued release of gas subsequently through the pipe 168 will eventually reduce static pressure in the test zone sufficiently to permit formation fluids to flow into the test zone. If desired, flow may be stopped immediately to record the results of diffusion in the test zone, or flow may be continued until a relatively stable flow pattern is indicated.

Throughout such a test procedure, the plurality of electrodes is stationary in the well and the test procedure is carried out without interruption, it being necessary merely to manipulate the valve that controls release of gas from the well, the indicating instruments 180a—180f corresponding to the various pairs of electrodes being continuously observed by the operator for guidance in manipulating the gas valve. Here again automatic recording will be found advantageous and the mechanism heretofore described may be employed. This second procedure includes all the advantages over prior art methods that inhere in the fact that the electrodes are stationary, that inhere in the fact that flow is under close control, and that inhere in the fact that effects in the well are observable continually throughout the test period. It will be apparent to those skilled in the art that several of the well known gas-lift methods may be employed to cause and maintain well flow in carrying out my methods.

My invention may also be practiced with the apparatus of Figs. 12 and 13 by first conditioning a well and then, with the top of the well open, swabbing out conditioning fluid until the hydrostatic pressure drops below formation pressures. Flow of formation fluids into the test zone will then commence and will continue for a substantial period if the well is unbalanced by a substantial margin. The test cable carrying the plurality of electrodes may then be lowered into the well for continuous observation over a period of flow to ascertain the pattern of flow in the test zone. The latter practice, however, obviously lacks several important advantages heretofore noted and involves considerable risk of the well blowing out, especially if the well has relatively high formation pressures.

It is to be emphasized that test problems vary widely and that any test procedure must be adapted to the particular conditions confronted. The basic principles involved, however, will be apparent to those skilled in the art from my foregoing disclosure, and I reserve the right to all departures from the procedures set forth and all modifications and changes of the apparatus described that fall within the scope of my appended claims.

I claim as my invention:

1. A method of determining the points of ingress of formation fluids in a bore hole, including the steps of: filling a test zone of the bore hole with a conditioning fluid at pressure sufficiently above formation pressure to prevent flow of formation fluids thereinto; temporarily lowering the pressure of said conditioning fluid long enough to permit representative bodies of formation fluids to enter the bore hole, but not long enough to cause substantial displacement or substantial flow of the bodies; and recording fluid character continuously and simultaneously at a plurality of spaced points in said test zone to reveal progressive diffusion from said bodies as centers.

2. A method of determining the points of ingress of formation fluids in a bore hole, including the steps of: loading said bore hole with fluid to overbalance formation pressure sufficiently to prevent flow of formation fluids thereinto; sealing off a test zone of the bore hole; drawing off fluid from said sealed test zone to initiate flow of formation fluids thereinto; and recording fluid character continuously and simultaneously at a plurality of spaced points in said test zone in the course of said flow of formation fluids.

3. A method of determining the relative character and location of formation fluids communicating with an uncased bore hole that is loaded with a fluid column supporting the walls thereof, said method including the steps of: sailing off a test zone of the bore hole; providing communication to atmospheric pressure through said fluid column from said test zone, thereby lowering the pressure in said test zone sufficiently to initiate flow of formation fluids thereinto without lowering the pressure of said fluid column against the bore hole walls outside of the test zone; and recording fluid character continuously and simultaneously at a plurality of spaced points in said test zone in the course of said flow of formation fluids.

4. A method as set forth in claim 2 in which the pressure in the test zone is lowered long enough to permit representative bodies of formation fluids to enter the bore hole, but not long enough to cause displacement or substantial flow of the bodies, whereby progressive diffusion from said bodies as centres will be revealed by said recording.

5. A method of determining the relative character and location of fluids communicating with a bore hole that is loaded with a fluid column, said method including the steps of: sealing off a test zone of the bore hole; providing a channel to atmosphere through said fluid column from said test zone, thereby lowering the pressure in said test zone sufficiently to cause flow of formation fluids thereinto and upward through the channel; and recording fluid character continuously and simultaneously at a plurality of spaced points in said test zone in the course of said flow of formation fluids; and restricting said channel to attenuate the effects recorded.

6. A method of employing automatic recording means responsive to changes in fluid character for the purpose of determining the relative character and location of formation fluids communicating with a well bore hole, said method including the steps of: lowering a plurality of said automatic recording means into the bore hole into complete isolation from the surface of the well to respond to changes in fluid character simultaneously at a plurality of spaced points in a test zone of the well for the duration of a test period; and holding fluid pressure in the bore hole below formation pressure to cause flow of formation fluids into said test zone during said test period.

7. A method of employing automatic recording means responsive to changes in fluid character for the purpose of determining the relative character and location of formation fluids communicating with a bore hole that is loaded with a fluid column preponderant over formation pressure, said method including: lowering a plurality of said automatic recording means into the well into complete isolation from the surface of the well to respond to changes in fluid character simultaneously at a plurality of spaced points in a test zone of the well for the duration of a test period; sealing off said test zone; providing a channel through said fluid column from said test zone to the surface of the well; and releasing fluid from said sealed test zone through said channel to cause formation fluids to flow into the test zone during a test period.

8. A method of employing means responsive to changes in fluid character for the purpose of determining the relative character and points of ingress of formation fluids in a bore hole, including the steps of: loading said bore hole with liquid to overbalance formation pressure sufficiently to prevent flow of formation fluids thereinto; placing in the well at vertically spaced positions a plurality of said means responsive to changes in fluid character; sealing off said bore hole after said means are in position; introducing compressed gas into the bore and drawing off a portion of said liquid to attain a condition in which a liquid column combined with gas pressure overbalances formation pressure, the quantity of liquid being insufficient alone for such overbalancing; releasing gas from the well to reduce the well pressure below formation pressure to initiate flow of formation fluids into the well; observing the effects of such release on each of said responsive means continuously for the duration of a test period; and then introducing sufficient liquid into the well to hold in abeyance formation flow by liquid pressure alone to permit unsealing the bore hole for withdrawal of said responsive means.

9. A method as set forth in claim 8 in which guidance in the release of the gas from the well is obtained from observing the actions of said responsive means.

10. A method of employing means responsive to changes in fluid character for the purpose of determining the relative character and points of ingress of formation fluids in a bore hole, including the steps of: simultaneously recording changes of fluid character at a plurality of vertically spaced points in a test zone of the bore hole while the static pressure of fluid in the test zone is sufficiently below formation pressure to permit sustained flow of formation fluids into the bore hole, thereby bracketing a portion of the test zone in which ingress of a selected formation fluid occurs; and then simultaneously recording changes of fluid character at closer spaced points within the bracketed zone while the static pressure is low enough to permit sustained flow of formation fluids into the bore hole.

11. An apparatus for determining the points of ingress of formation fluids in a well bore hole, comprising: a plurality of means each responsive to changes in fluid character immediately adjacent each of said means; means to support said responsive means stationary at spaced points in a selected zone of the bore hole for the duration of a test period; and indicating means responsive to each of said responsive means to reveal changes in said fluid character.

12. An apparatus for determining the points of ingress of formation fluids in a well bore hole, comprising: a plurality of means each responsive to changes in fluid character immediately adjacent each of said means; means to support said responsive means stationary at spaced points in a selected zone of the bore hole for the duration of a test period; and means operatively connected to each of said responsive means for continuously recording responses thereof during said test period.

13. An apparatus for determining the points of ingress of formation fluids in a well bore hole, comprising: a tubing string adapted to extend into a test zone of a bore hole; a packer embracing said tubing string to seal off said test zone; a plurality of means responsive to changes in fluid character carried by said tubing string at spaced fixed points relative thereto positioned to lie within said test zone; and indicating means responsive to each of said responsive means to reveal changes thereof.

14. An apparatus for determining the points of ingress of formation fluids in a well bore hole, comprising: a tubing string adapted to extend into a test zone of a bore hole; valve means to control upward flow through said tubing string, said valve means being normally closed and being adapted to be opened when said tubing is installed in a bore hole; a plurality of means responsive to changes in fluid character carried by said tubing string at spaced fixed points relative thereto positioned to lie within said test zone to be affected by fluids flowing from said test zone into said tubing; and indicating means for each of said responsive means to reveal changes thereof.

15. An apparatus as set forth in claim 14 in which said tubing is embraced by a packer to seal off said test zone.

16. An apparatus for determining the points of ingress of formation fluids in a well bore hole, comprising: a tubing string adapted to extend into a test zone of a bore hole; valve means to control upward flow through said tubing string, said valve means being normally closed and being adapted to be opened when said tubing is installed in a bore hole; a plurality of means responsive to changes in fluid character carried by said tubing string at spaced fixed points relative thereto positioned to lie within said test zone to be affected by fluids flowing from said test zone into said tubing; and means carried by said tubing to operate at a subterranean position for continuously recording the responses of each of said responsive means through a test period following opening of said valve.

17. An apparatus as set forth in claim 16 in which said recording means is adapted to start automatically when said valve is opened.

18. An apparatus as set forth in claim 16 in which operation of said recording means is initiated by opening of said valve and thereafter continues independently of valve operation.

19. An apparatus as set forth in claim 16 in which said responsive means are in electrical communication with said recording means and in which said recording means produces a photographic record of the responses to changes in fluid character in said test zone.

20. An apparatus for determining the points of ingress of formation fluids in a well bore hole, comprising: a tubing string adapted to extend into a test zone of a bore hole; valve means to control upward flow through said tubing string, said valve means being normally closed and being adapted to be opened when said tubing is installed in a bore hole; a plurality of means responsive to changes in fluid character carried by said tubing string at spaced fixed points relative thereto positioned to lie within said test zone to be affected by fluids flowing from said test zone into said tubing; a packer embracing said tubing to seal off said test zone; and means carried by said tubing in the lower half thereof for continuously recording the responses of each of said responsive means through a test period following opening of said valve.

21. A method of determining the relative character and points of ingress of formation fluids in a bore hole, including the steps of: sealing off a test zone at the lower end of the bore hole from the major portion of the bore hole with the static pressure of the fluid therein above the formation pressure to prevent formation flow; reducing the static pressure in said zone below formation pressure to initiate flow of formation fluids thereinto while the test zone remains sealed; and simultaneously recording fluid character changes at a plurality of spaced points in said test zone over a period of time including the moment of said flow initiation.

22. A method of determining the points of ingress of formation fluids in a bore hole, including the steps of: loading the bore hole with a column of conditioning fluid at pressure to preclude flow of formation fluids thereinto; sealing off a test zone of the bore hole to isolate the test zone from the major portion of said column; providing communication to atmospheric pressure through said fluid column from said test zone while maintaining said test zone isolated from the major portion of said fluid column, thereby lowering the pressure in said test zone sufficiently to initiate flow of formation fluids thereinto without lowering the pressure of said fluid column against the bore hole walls outside of the test zone; and recording changes in fluid character continuously and simultaneously at a plurality of spaced points in said test zone over a period sufficient for formation fluids to substantially completely displace conditioning fluid in said test zone.

23. A method of employing automatic recording means responsive to changes in fluid character for the purpose of determining the relative character and points of ingress of formation fluids associated with a bore hole, including the steps of: loading the bore hole with a fluid distinct in character with respect to said formation fluids at sufficient pressure to hold flow of the formation fluids in abeyance; lowering a plurality of said automatic recording means into the bore hole to respond to changes in fluid character simultaneously at a plurality of fixed vertically spaced points in a test zone of the bore hole continuously for the duration of a test period; and lowering the pressure of said loading fluid to cause initiation of flow of the formation fluids early in said test period.

24. A method of determining the relative character and points of ingress of formation fluids associated with a bore hole, which method comprises, establishing a varying condition of fluids in a test zone in said bore hole by flow of formation fluids into said bore hole and determining changes in said fluid character simultaneously at a plurality of selected vertically spaced points in said test zone for a substantial period of time at each of said spaced points during said varying condition.

25. A method of determining the relative character and points of ingress of formation fluids associated with a bore hole which method comprises, establishing a fluid pressure in a test zone in said bore hole sufficiently below formation pressure to provide for flow of formation fluids into said test zone, and determining changes in fluid character simultaneously at a plurality of selected vertically spaced points in said zone for a substantial period of time at each of said spaced points during said flow of said formation fluids into said zone.

26. A method of determining the relative character and points of ingress of formation fluids associated with a bore hole, which method comprises, initiating flow of formation fluids into a test zone in said bore hole by reducing the fluid pressure to a pressure below the formation pressure, and determining changes in fluid character simultaneously at a plurality of selected vertically spaced points in said zone during said initiation of said flow.

27. The method of determining the relative character and points of ingress of formation fluids associated with a bore hole, which method comprises, establishing a varying condition of fluids in a test zone in said bore hole by flow of formation fluids into said bore hole, and determining changes in the fluid character at each of a plurality of selected vertically spaced fixed points during a test period of substantial length of time under said varying condition, the determination of said changes in fluid character at each of said points being substantially coextensive with said test period.

JOHN R. GILLBERGH.